United States Patent
Moroto et al.

[11] Patent Number: 5,892,346
[45] Date of Patent: Apr. 6, 1999

[54] VEHICLE

[75] Inventors: Shuzo Moroto; Takahiro Iwami; Hideki Nakashima, all of Aichi-pref., Japan

[73] Assignee: Kabushikikaisha Equos Research, Japan

[21] Appl. No.: 603,324

[22] Filed: Feb. 20, 1996

[30] Foreign Application Priority Data

Feb. 27, 1995 [JP] Japan ................................ 7-064996

[51] Int. Cl.⁶ .............................. H02J 7/00; G05D 1/00
[52] U.S. Cl. .................... 318/587; 318/139; 318/568.1; 320/15; 320/13; 320/48; 364/424.01
[58] Field of Search ................................ 318/139, 587, 318/560–696; 364/424.02, 424.06, 444, 424.01; 180/168, 65.1, 167; 395/90; 901/1; 414/227; 320/15, 22, 39, 13, 48, 43; D10/125

[56] References Cited

U.S. PATENT DOCUMENTS

| D. 378,500 | 3/1997 | Nakai et al. .......................... D10/125 |
| 4,551,803 | 11/1985 | Hosaka et al. ...................... 364/431.05 |
| 4,672,280 | 6/1987 | Honjo ...................................... 318/587 |
| 4,751,658 | 6/1988 | Kadonoff et al. ........................ 364/513 |
| 4,777,416 | 10/1988 | George et al. .......................... 318/568 |
| 5,204,814 | 4/1993 | Noonan et al. ..................... 364/424.02 |
| 5,280,431 | 1/1994 | Summerville et al. ............. 364/424.02 |
| 5,367,455 | 11/1994 | Kitagawa et al. .................. 364/424.01 |
| 5,598,087 | 1/1997 | Hara .......................................... 320/48 |
| 5,612,608 | 3/1997 | Ishiguro et al. .......................... 320/48 |
| 5,614,804 | 3/1997 | Kayano et al. ............................ 320/13 |
| 5,623,194 | 4/1997 | Boll et al. ................................. 320/15 |

*Primary Examiner*—Paul Ip
*Attorney, Agent, or Firm*—Lorusso & Loud

[57] ABSTRACT

A vehicle, which is either an electric vehicle or a hybrid vehicle, capable of achieving low-pollution emissions and saving energy by maximizing use of the capacity of the battery. A navigation ECU receives input identifying a starting location where the battery is charged, a stopover location, and a destination where battery recharging is planned, and calculates travel distances from the starting location to the stopover location and to the destination based on geographic data for the starting location, the stopover location and the destination, and schedules electric power consumption corresponding to distance travelled, based on the respective calculated distances, to assign a battery residual capacity usage value for each leg of the trip. A vehicle ECU supplies electric power from the battery to the motor in accordance with that schedule.

41 Claims, 11 Drawing Sheets

FIG. 3 (A)

| DATE | TIME | STARTING PLACE | DESTINATION | CHARGE AT DESTINATION |
|---|---|---|---|---|
| 1/27 | AM 8:00- 8:30 | HOUSE | COMPANY | IMPOSSIBLE |
| | PM 5:00- 6:00 | COMPANY | HOUSE | POSSIBLE |
| 1/28 | AM10:00-11:00 | HOUSE | POINT A | IMPOSSIBLE |
| | PM 1:00- 2:00 | POINT A | POINT B | IMPOSSIBLE |
| | PM10:00-11:00 | POINT B | HOUSE | POSSIBLE |
| 1/29 | AM 7:00- 7:30 | HOUSE | COMPANY | IMPOSSIBLE |
| | PM 5:00- 6:00 | COMPANY | HOUSE | POSSIBLE |

FIG. 3 (B)

| ROUTE | DISTANCE (Km) | STARTING PLACE SOC | DESTINATION SOC | CHARGE AT DESTINATION |
|---|---|---|---|---|
| 1 | 10 | 100% | 50% | IMPOSSIBLE |
| 2 | 10 | 50% | 0% | POSSIBLE |
| 3 | 20 | 100% | 60% | IMPOSSIBLE |
| 4 | 10 | 60% | 40% | IMPOSSIBLE |
| 5 | 20 | 40% | 0% | POSSIBLE |
| 6 | 10 | 80% | 40% | IMPOSSIBLE |
| 7 | 10 | 40% | 0% | POSSIBLE |

FIG. 8 (A)

| DATE | TIME | STARTING PLACE | DESTINATION | CHARGE AT DESTINATION |
|---|---|---|---|---|
| 3/27 | AM 8:00- 8:30 | HOUSE | COMPANY | IMPOSSIBLE |
| | PM10:30-11:00 | COMPANY | HOUSE | POSSIBLE |
| 3/28 | AM 7:00- 8:00 | HOUSE | POINT A | IMPOSSIBLE |
| | PM 1:00- 2:00 | POINT A | POINT B | IMPOSSIBLE |
| | PM10:00-11:00 | POINT B | HOUSE | POSSIBLE |
| 3/29 | AM10:00-10:30 | HOUSE | COMPANY | IMPOSSIBLE |
| | PM 5:00- 6:00 | COMPANY | HOUSE | POSSIBLE |

FIG. 8 (B)

| ROUTE | DISTANCE (Km) | STARTING PLACE SOC | DESTINATION SOC | CHARGE AT DESTINATION |
|---|---|---|---|---|
| 1 | 10 | 100% | 60% | IMPOSSIBLE |
| 2 | 10 | 60% | 20% | POSSIBLE |
| 3 | 20 | 100% | 60% | IMPOSSIBLE |
| 4 | 10 | 60% | 40% | IMPOSSIBLE |
| 5 | 20 | 40% | 0% | POSSIBLE |
| 6 | 10 | 100% | 50% | IMPOSSIBLE |
| 7 | 10 | 50% | 0% | POSSIBLE |

VEHICLE

BACKGROUND OF THE INVENTION

1. Field of the Invention

This invention relates to a vehicle which is driven by both an internal combustion engine using fuel and/or by an electric motor driven by electric power from a battery.

2. Description of the Related Art

One important difference between an electric vehicle and a vehicle driven by an internal combustion engine (ICE) is that the ICE-powered vehicle can be driven several hundred Km without refueling. On the other hand, if provided with a battery that can be charged to an extent to allow driving for several hundred Km, the electric vehicle's weight becomes excessive and, if provided. with a lighter weight battery that cannot be charged with as much electric power, the electric vehicle has a shorter traveling range.

In order to address the aforementioned limitations of an electric vehicle, a hybrid vehicle has been developed which has an internal combustion engine as an auxiliary power source. In the early stages of development of hybrid vehicles the internal combustion engine was used only after the battery had no remaining charge. More recent hybrid vehicles combine output from the internal combustion engine and output from the motor, relying on the internal combustion engine when high torque is required, for example, in accelerating the vehicle, and utilizing the motor to generate a torque allowing the ICE to use fuel with greatest efficiency or to power the vehicle without output from the ICE.

In the electric vehicle and hybrid vehicle, ideally the capacity of the battery will last until the vehicle is recharged in order to achieve the objectives of low-pollution and energy savings. However, once the capacity of the battery is exhausted during a journey, if an electric vehicle it cannot be driven further, and if a hybrid vehicle it must then be driven using only the internal combustion engine, with diminished driving performance in terms of pollution, energy efficiency and output. Therefore, electric vehicles and hybrid vehicles should have sufficient battery capacity to complete a journey.

SUMMARY OF THE INVENTION

Accordingly, the object of the present invention is to solve the aforementioned disadvantages of the prior art hybrid and electric vehicles. In other words, it is the object of the present invention to adapt electric vehicles and hybrid vehicles for use of the capacity of the battery as effectively as possible.

To attain the aforementioned object, a vehicle according to the present invention is provided with: an electric motor; a motor drive control unit for controlling consumption of electric power from a battery by the electric motor; battery residual capacity detection means for detecting actual residual capacity of the battery; input means for inputting schedule information including a travel route; schedule information memory means for storing the schedule information input through the input means; provisional position memory means for storing items of information, included in the schedule information, which relate to geographic points between a point of departure where the battery is charged, and a certain destination where the battery is to be recharged; distance calculating means for calculating total distance from the point of departure to the destination based on the geographic positional information kept in the provisional position memory means; and power consumption programming means for programming (scheduling) power consumption according to the travel distance, i.e. the total distance obtained by the distance calculating means, to control discharge of the actual residual capacity of the battery measured by the battery residual capacity detection means, so that the motor drive control unit supplies the electric power from the battery to the electric motor in accordance with programmed schedule developed by the power consumption programming means.

Optionally, the vehicle may further have an internal combustion engine to drive the vehicle, i.e. a hybrid vehicle.

Further, the input means may be a terminal, such as a touch panel, an electric diary, an IC card or a personal computer for transmitting the schedule information by radio wave or infrared.

The battery residual capacity detection means may define, as the "discharged state" for the battery, a minimum capacity value for the battery which allows the battery to be used repeatedly and economically and may define, as the "full-charge state" of the battery, a maximum capacity value for the battery which allows the battery to be used repeatedly and economically.

The aforementioned power consumption programming means is adapted to schedule power consumption corresponding to the traveling distance by dividing the battery residual capacity by the calculated travel distance.

Further, the vehicle may further be equipped with charge time calculating means for determining a time period for recharging the battery based on a starting date/time at a battery charging facility and the last destination arrival date/time in accordance with the schedule information or input individual trip information.

The aforementioned schedule information memory means stores, as trip-specific information, at least either the name and address or phone number for each location flagged (specified) along the route of travel, and includes starting and arrival dates and times for each flagged location on the route of travel and, further, information as to whether or not battery recharging can be obtained at each location flagged along the route of travel. For example, the schedule information memory means may store such information for the starting location, destination and an intermediate stopover location.

The vehicle as described thus far may further have a navigation system for searching map data and determining a travel route to the specified destination and, in this case, the aforementioned distance calculating means will obtain the total distance for the travel route determined by the navigation system.

The provisional position memory means stores items of information, included in the scheduled information, relating to geographic locations of successive destinations having battery recharging facilities. In this case the distance calculating means would obtain the distance from the present starting location, to the present destination for recharging the battery and the distance from that recharging facility, the new starting location to the next following destination with facilities for recharging the battery, based on the geographic positional information kept in the provisional position memory means.

Charge time decision means may be provided for checking whether the time available for recharging at any one location is less than the time required to recharge the battery from a battery residual capacity of by 0% to 100%.

The control system of the present invention may further include battery residual capacity decision means for determining battery residual capacity expected upon completion of the present journey, based on the calculated travel distance, when the charge time decision means decides that the time available for recharging is less than the time required to provide a "full charge" and when the next leg of travel is found to be longer than the present trip by the distance calculating means. The battery residual capacity decision means is adapted to calculate the battery residual capacity after the present journey upon recharging. In this case, the power consumption programming means may schedule usage of battery residual capacity by subtracting the battery residual capacity determined by the battery residual capacity decision means from the battery residual capacity detected by the battery residual capacity detection means and dividing the result by the calculated travel distance.

BRIEF DESCRIPTION OF THE DRAWINGS

FIG. 3 (A) and FIG. 3 (B) are tables of, respectively, a user schedule input into the navigation ECU and a programmed schedule of battery residual capacity based on the user schedule;

FIGS. 8(A) and 8(B) are, respectively, a user schedule table input into the navigation ECU, and a programming schedule table for battery residual capacity based on the user schedule according to a second embodiment;

DETAILED DESCRIPTION OF THE PREFERRED EMBODIMENT(S)

Figure 1:
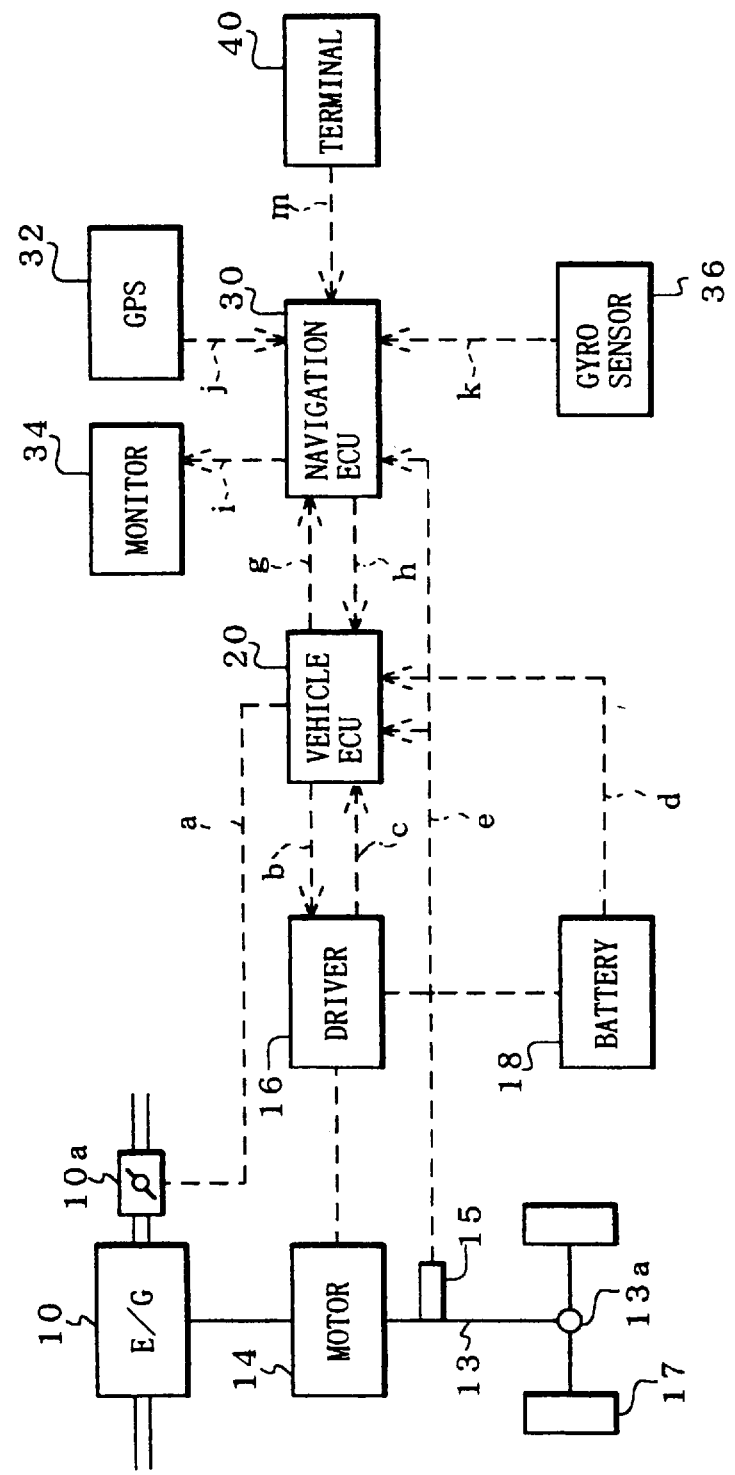
FIG. 1 is a block diagram showing structure of a hybrid vehicle of a first embodiment according to the present invention.

Certain terminology is used in the following description for convenience in reference only and is not intended to be limiting. The words "up", "down", "right" and "left" designate directions in the drawings to which reference is made. The words "in" and "out" refer to directions toward and away from, respectively, the geometric center of the device and designated parts thereof. Such terminology will include derivatives and words of similar import.

Preferred embodiments according to the present invention will now be described with reference to the accompanying drawings.

FIG. 1 shows a first embodiment according to the present invention in the form of a hybrid vehicle which has a gasoline internal combustion engine 10 and an electric motor 14 as power sources, both of which are adapted to be controlled by a single vehicle ECU 20. A navigation ECU 30 is provided to calculate the current vehicle geographic position and to guide the vehicle along a route to a destination. The vehicle ECU 20 controls the gasoline internal combustion engine 10 and the motor 14 in accordance with the amount of electric power usage which is planned by the navigation ECU 30.

The motor 14 is an induction type motor, which operates as a direct current motor together with a driver 16 in an inverter circuit. The gasoline internal combustion engine 10 is a four-cycle, three-cylinder engine of 660 cc, which outputs torque through a drive shaft 13. The motor 14 is connected to the drive shaft 13 to either output torque through the drive shaft 13 when operating in a motor mode under control by the driver 1 or to receive torque from the drive shaft 13 when operating in a generator mode to generate electric power. Torque is output through drive shaft 13 to wheels 17 through a differential gear unit 13a.

The vehicle ECU 20, controlling the gasoline internal combustion engine 10 and the motor 14, contains a single chip as a microprocessor and adjusts the degree of throttle opening for the gasoline internal combustion engine 10 by outputting a throttle signal a, so as to control the output of the gasoline internal combustion engine 10. Further, the vehicle ECU 20 receives a motor condition signal c from the driver 16, which then, by sending a motor control signal b to the driver 16, either causes the battery 18 to supply power to the motor 14, or charges the battery 18 by operating the motor 14 in the generator mode, for example when the vehicle is driven on a downhill slope and when braking. The vehicle ECU 20 receives battery condition signal d from the battery 18 which is then output as a battery residual capacity signal g to the navigation ECU 30. The vehicle ECU 20 and the navigation ECU 30 both receive a vehicle speed signal e from vehicle speed sensor 15.

The navigation ECU 30, which calculates the present vehicle geographic position and programs a schedule for the use of battery capacity as will be described below, contains a single chip microprocessor. The navigation ECU 30 is receives: from a gyro sensor 36, a gyro sensor signal k; a present geographic position signal j which is calculated using a GPS (Global Positioning System) receiver 32; and, from a vehicle speed sensor 15, the aforementioned vehicle speed signal e. The navigation ECU 30 calculates the present geographic position based on these signals. The navigation ECU 30 has map data stored in a self-contained ROM (not-shown), and is adapted to guide the vehicle along the route by sending a display signal i, organized from map information including the aforementioned calculated present geographic position, to a monitor 34 for display thereon. Further, the navigation ECU 30 calculates a target battery residual capacity instruction h, based on the aforementioned calculated present geographic position of the vehicle, the aforementioned battery residual capacity signal g, and a schedule for the use of capacity of the battery as will be described below. The target battery residual capacity instruction h is output to the vehicle ECU 20 in order to instruct the vehicle ECU 20 in use of the charge remaining in the battery ("residual charge").

The navigation ECU 30 receives as input a destination data schedule m from a terminal 40. The terminal 40 is, for example, an electric diary, into which a schedule is input by the user of the hybrid vehicle. By instruction of the user, the schedule is sent as the destination data schedule m to the navigation ECU 30.

Figure 10:
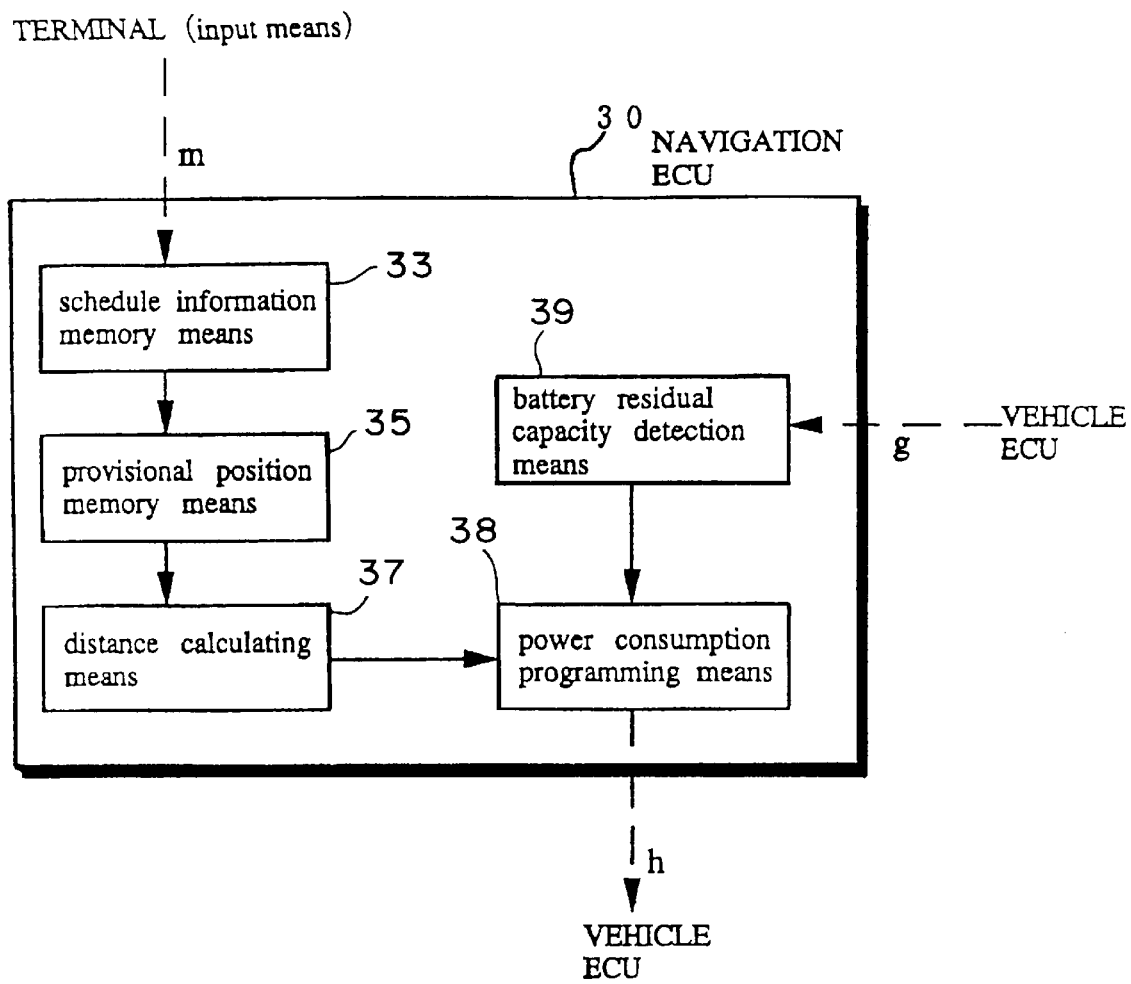
FIG. 10 is a block diagram of a first embodiment of a vehicle ECU which may be utilized in the present invention.
Figure 11:
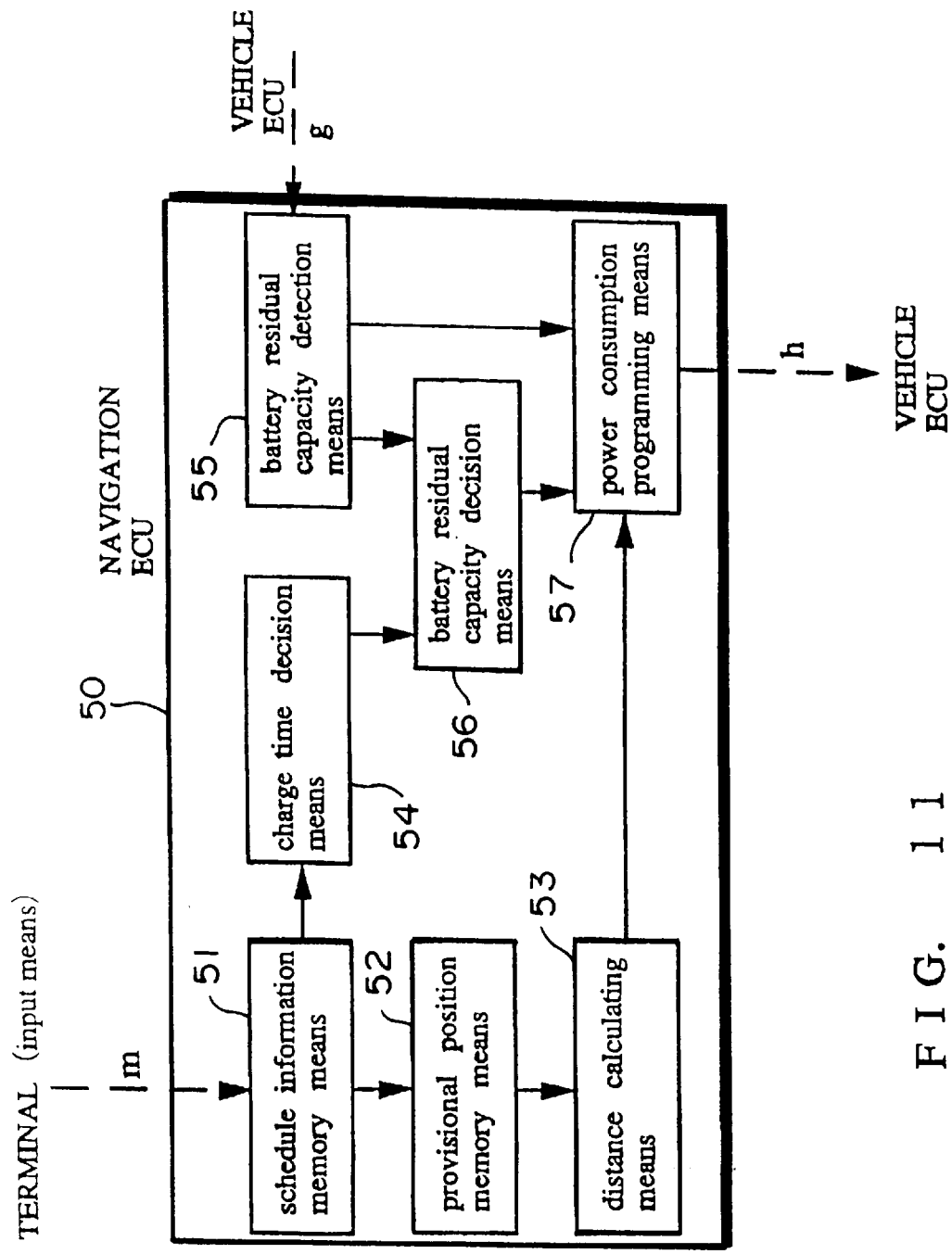
FIG. 11 is a block diagram of a second embodiment of a vehicle ECU which may be utilized in the present invention.

As shown in FIG. 10, the navigation ECU includes a schedule information memory 33 for storing the schedule information input. through terminal 40. A selected portion of that input schedule information is temporarily stored in the provisional position memory 35 and that selected schedule information will be inclusive of data identifying geographic positions including a starting location (where the battery is "charged") and a destination having facilities for recharging the battery. The distance calculating means 37 calculates the total distance from the starting location to the destination based on geographic data stored in the provisional position memory. A battery residual capacity detector 39 detects the battery charge (full charge=100% SOC) at the outset of the trip, i.e. prior to start of travel. Based on information received from the distance calculating means 37 and the battery residual capacity detector 39, power consumption programming means 38 develops a schedule for consumption of electric power by the electric motor, in accordance with distance travelled, based on the total distance calculated by the distance calculating means 37 and the residual capacity detected by the battery residual capacity detector 39.

Here, operation of the navigation ECU 30 in the hybrid vehicle according to the first embodiment will be explained with reference to FIGS. 2 to 6. Through terminal 40 is input data such as, on each date shown in FIG. 3(A), an expected starting time, an expected arrival time, a starting place, a certain destination and whether or not the battery is to be recharged at the destination. The Yes/No determinations (FIGS. 4–6) are automatically programmed in the terminal by input of the destination, taking into consideration pre-stored information identifying locations having facilities for recharging the battery.

Figure 2:
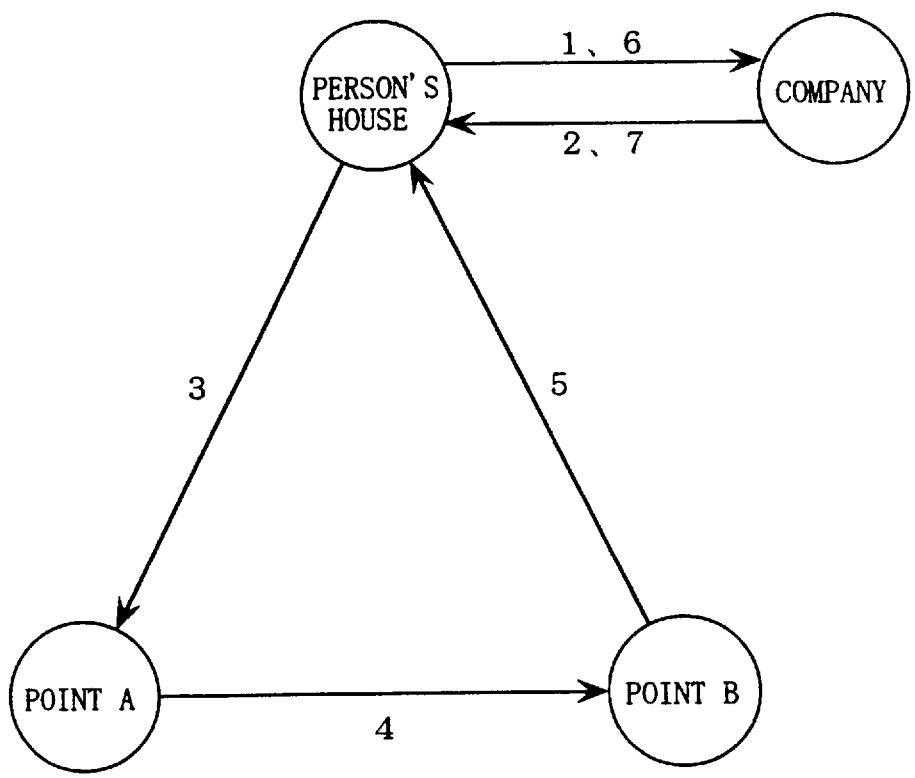
FIG. 2 is a diagram illustrating a route search by the navigation ECU.
Figure 4:
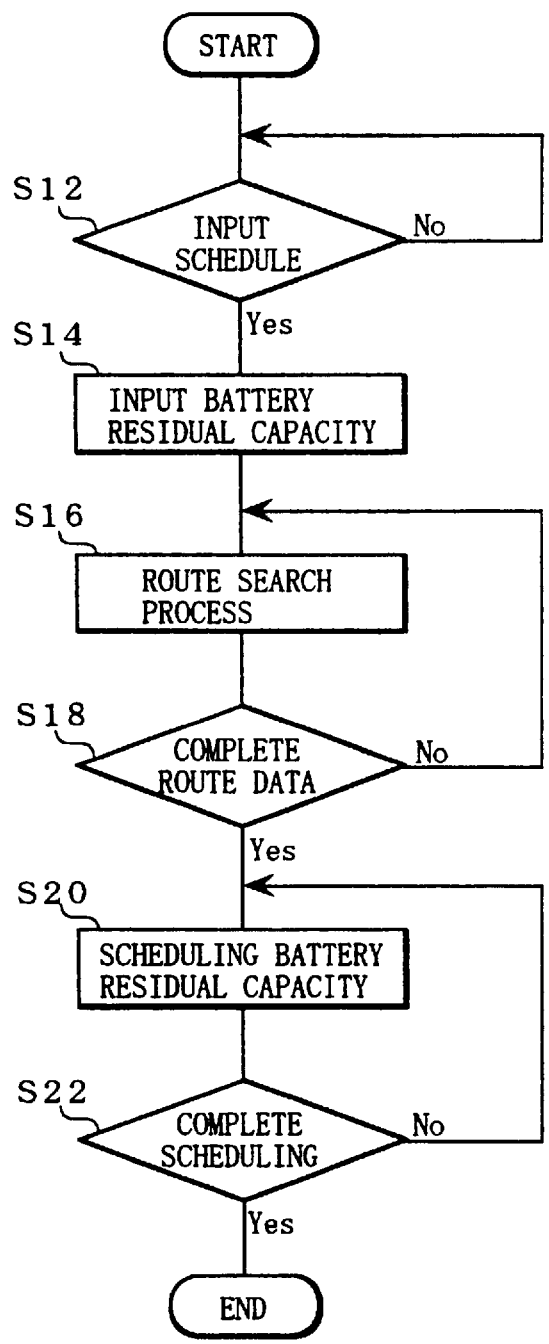
FIG. 4 is a flow chart of a target battery residual capacity calculation routine executed by the navigation ECU.

FIG. 4 illustrates a routine for scheduling use of the battery charge (a target battery residual capacity calculation), which is executed by the navigation ECU 30 before start of travel. When the destination data schedule m as shown in FIG. 3 (A) is transmitted from the terminal 40, the navigation ECU 30 proceeds to "Yes" in Step 12 to input the battery residual capacity (SOC) (S14), based on the assumption that the value SOC is 100% battery capacity of the fully-charged battery 18. A route search routine is then started (S16). In the route search routine, routes from each starting place to each destination are scanned based on the destination schedule data m. More specifically, the navigation ECU 30 first determines position coordinates for the starting place (a home) and the destination (a place of business) on the 27th of January by using a self-contained ROM, and then determines a suitable route linking the two coordinate positions from the map data stored in the ROM. As a result, route 1 from the home to the place of business shown in FIG. 2 is decided and the travel distance for route 1 is calculated. Then it is determined whether or not formation of all data for the route is completed (S18). If the determination of Step 18 is "No", the routine returns to Step 16 and the next route (route 2—see FIG. 2) linking from the next starting place (the place of business) to the next destination (the home) on the 27th of January is scanned. Then, completing the formation of all data as to the other routes, including route 3 between the home and a point A, route 4 between the point A and a point B, route 5 between the point B and the home on the 28th of January, route 6 between the home and the place of business and route 7 between the place of business and the home on the 29th of January, the determination of "Complete route data" in Step 18 results in "Yes". The routine then proceeds to the "Battery residual capacity scheduling" subroutine in Step 20. FIG. 3(B) is a table indicating the travel distance (Km) for each route shown in FIG. 2.

Figure 5:
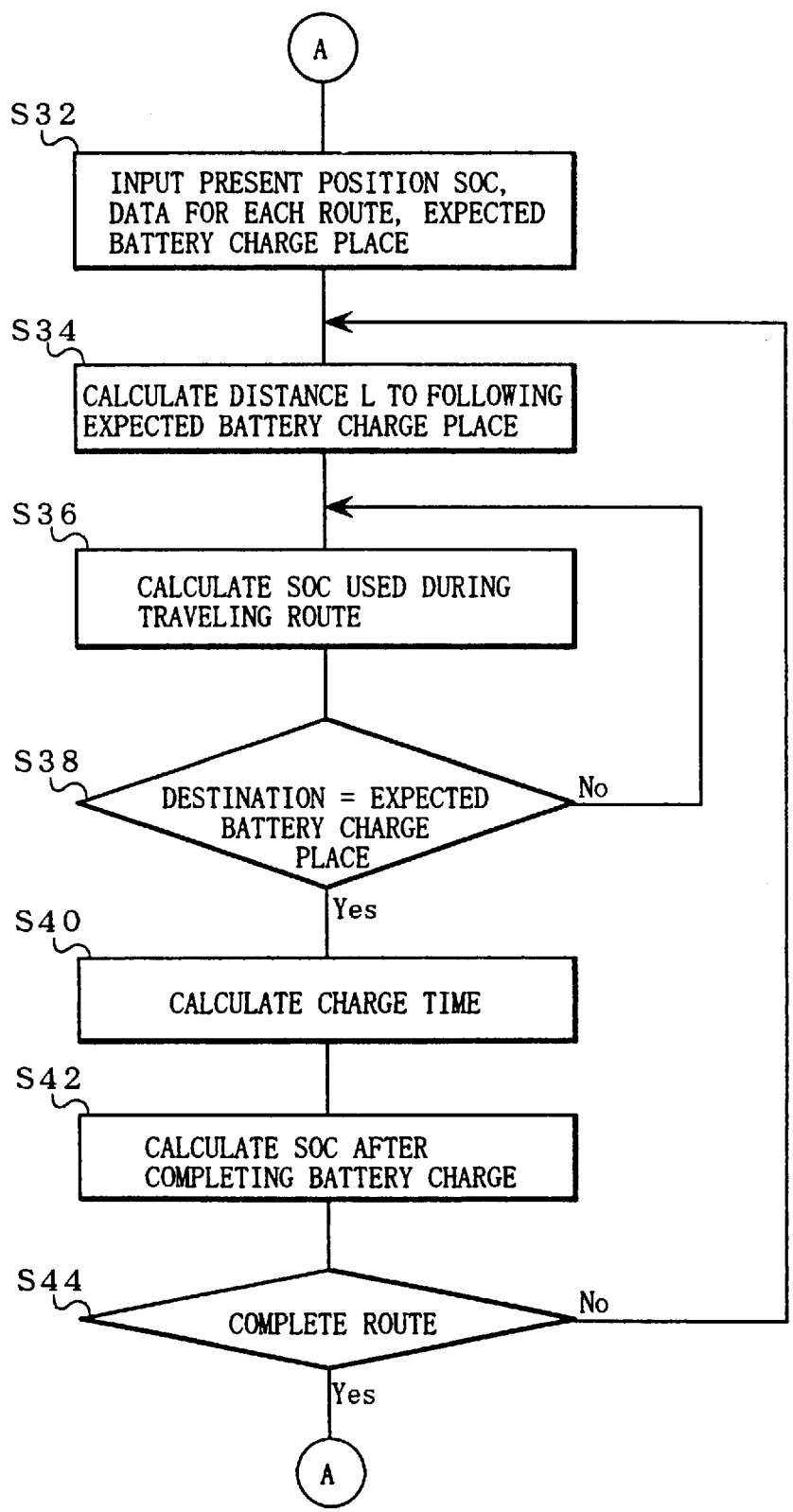
FIG. 5 is a flow chart of a scheduling subroutine used in the target battery residual capacity calculation routine shown in FIG. 4.

The battery residual capacity scheduling subroutine of Step 20 of FIG. 4 is illustrated by the flow chart of FIG. 5. The navigation ECU 30 inputs SOC (the battery residual capacity) at the present position in Step 14, data as to each route searched in Step 16, and further an expected location for battery recharging by using the destination schedule data m. In Step 34, a distance L to the next expected battery recharging location is calculated. That is, as shown in FIG. 3(B), the travel distance from the home to the place of business and the travel distance from the place of business to the home on the 27th of January are each 10 Km and, therefore, the distance L, from the starting place (the home) to the next expected location for battery recharging (the home), is calculated as 20 Km. Then, the navigation ECU 30 calculates the capacity of the battery used during travel of route 1 in which the vehicle travels from the home to the place of business (S36). Here, a value for the travel distance (10 Km) for route 1 is divided by the distance L (20 Km) to the next expected location for battery recharging, and the difference is multiplied by the value of the battery residual capacity (100%) which is input in Step 14 of FIG. 4. As a result, it is calculated that SOC used during travel of route 1 is 50% and, therefore, the SOC at the destination is 50% (see FIG. 3(B)). Next, it is determined whether or not the destination of route 1 is the next expected location for battery recharging (S38), and when the destination (the place of business) is not the next expected location for battery recharging ("No" in Step 38), the subroutine returns to Step 36 to calculate the value of SOC for route 2. Since 50% of the SOC is used in travel toward the destination (home) on route 2, the value of SOC at the destination for route 2 is calculated as 0%. Then, the determination in step 38 as to whether or not the destination in Step 38 is the next expected location for battery recharging results in "Yes" and the subroutine proceeds to Step 40.

In Step 40, the navigation ECU 40 calculates a battery charging time by determining the time of arrival at the next expected battery recharging location and the time of departure from that location. That is, the charging time is calculated as 16 hours between arrival at the destination (the next expected battery recharging location) at 6:00 p.m. on the 27th of January and the time of departure at 10:00 a.m. on the following day as shown in the schedule of FIG. 3(A). In Step 42, the SOC is calculated for when the battery charging is completed. The battery 18 can be charged from 0% SOC (zero capacity) to 100% SOC (full charge) in ten hours and, therefore, although the SOC is 0% at the time of arrival at the next expected battery recharging location, the 16 hours calculated in Step 40 is determined to be sufficient time for charging to 100% SOC. In Step 44, it is determined whether or not the battery residual capacity scheduling for all the routes has been completed. If the processing for the 27th of January has been completed, the determination in Step 44 is "No" and the routine returns to Step 34.

In Step 34, the distance L to the next expected battery recharging location on the 28th of January is calculated as a 20 Km travel distance for route 3, a 10 Km travel distance for route 4 and a 20 Km travel distance for route 5, the sum of which is 50 Km. Then, SOC used during travel of route 3 is calculated in Step 36. Here, the travel distance (20 Km) for route 3 is divided. by the distance L (50 Km) to the next expected battery recharging location and this result is multiplied by the value of the battery residual capacity (100%)

which is calculated in Step 42 as described above, with the result that a value of 40% is obtained. After calculating SOC used during travel of route 4 and route 5, Step 38 results in "Yes" and the subroutine proceeds to Step 40.

In Step 40, the charge time, between arrival at the expected destination on the 28th of January to the time of departure on the following day (on the 29th of January), is calculated. Here, eight hours from 11:00 p.m. to 7:00 a.m., is calculated as the charge time. In Step 42, the SOC after completion of the battery charging is calculated. As mentioned above, ten hours is needed to charge from zero capacity (0% SOC) to fully charged (100% SOC) and, therefore, a value of 80% is calculated as 100%×8/10. The determination whether or not the battery residual capacity scheduling for the whole route has been completed results in "No" in Step 44 and, therefore, the subroutine returns to Step 34.

In Step 34, the distance L to the next expected location for recharging on the 29th of January is calculated. The SOC used during travel of route 6 is then calculated in Step 36. Because the starting SOC is 80%, as calculated in Step 42 above, in this case the travel distance (10 Km) for route 6 divided by the distance L (20 Km) to the next expected battery recharging location, is multiplied by the value of the battery residual capacity (80%), with the result that the value for SOC used is obtained as 40%. That is, the SOC at the destination (40% SOC) is obtained by subtracting 40% from 80%. The subroutine then advances in the same way to calculate the amount of SOC used during route 7, whereby the battery residual capacity scheduling for all the routes is completed, and then the determination in Step 44 becomes "Yes". Now, the subroutine for the battery residual capacity scheduling shown in FIG. 5, namely Step 20 in the main routine of FIG. 4, has been completed and, therefore, the determination in Step 22 shown in FIG. 4 becomes "Yes", meaning that the scheduling for the amount of SOC used (the target battery residual capacity calculation process), which is executed by the navigation ECU 30 before start of travel, has been completed.

Incidentally, the aforementioned "zero capacity" (0%) does not mean that the capacity of the battery is literally or physically zero but, rather, refers to the lowest capacity value capable of economic and repeated use of the battery, which depends on the performance characteristics and material of the battery. For example, in a case of an alkaline cell, a relatively much lower capacity value can be used as compared to that for a lead cell. Thus, "zero capacity" means a predetermined residual. capacity. Similarly, "fully charged" (100% SOC) means the highest value capable of economically using the battery.

Figure 6:
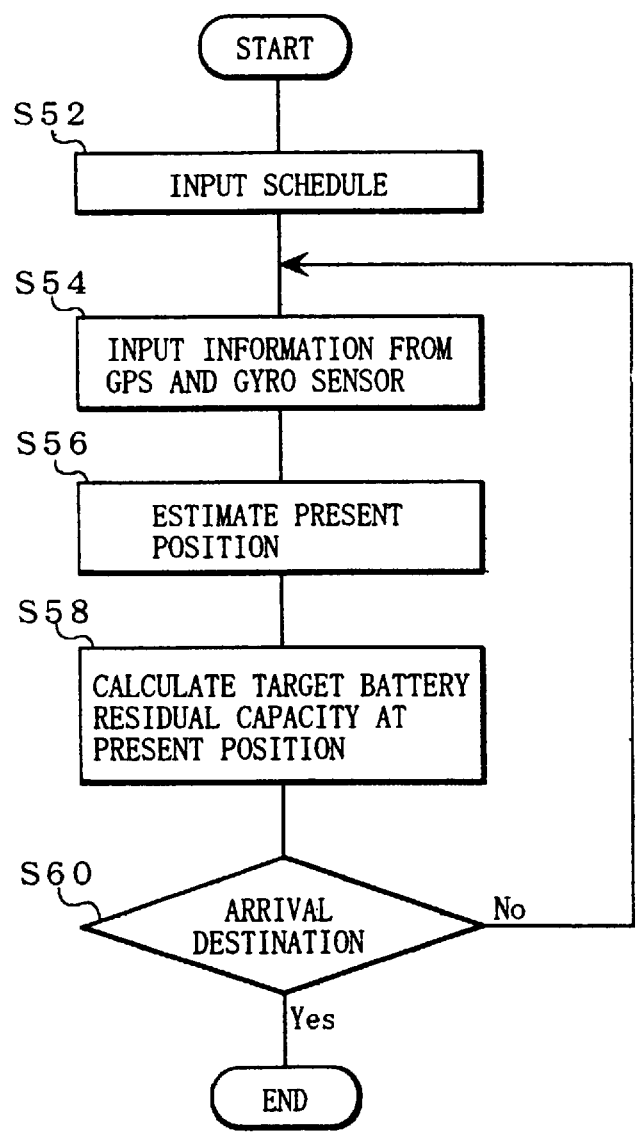
FIG. 6 is a flow chart of a routine for target battery residual capacity calculation executed by the navigation ECU.

Next, the navigation routine executed by ECU 30 while the hybrid vehicle is being driven, will be explained with reference to the block diagram of FIG. 1 and the flow chart of FIG. 6. The navigation ECU 30 receives the schedule (the target battery residual capacity) for battery usage, which is calculated by the aforementioned subroutine (S52), the gyro sensor signal k from the gyro sensor 36, the present geographic position j calculated using the GPS receiver 32, and the vehicle speed signal e from the vehicle speed sensor 15 (S54). The present position is estimated based on the aforementioned signals (S56). In Step 58, based on the schedule for battery usage, the target battery residual capacity is continuously calculated and output, during the journey, to the vehicle ECU 20, as the target battery residual capacity instruction h. In Step 60, it is determined whether or not the vehicle has arrived at the destination and, when the result is "No," the routine returns to Step 54 to continue outputting the target battery residual capacity instruction h on a continuous basis during the journey. Upon reaching the destination, the determination of Step 60 results in "Yes" and the routine is finished.

Figure 7:
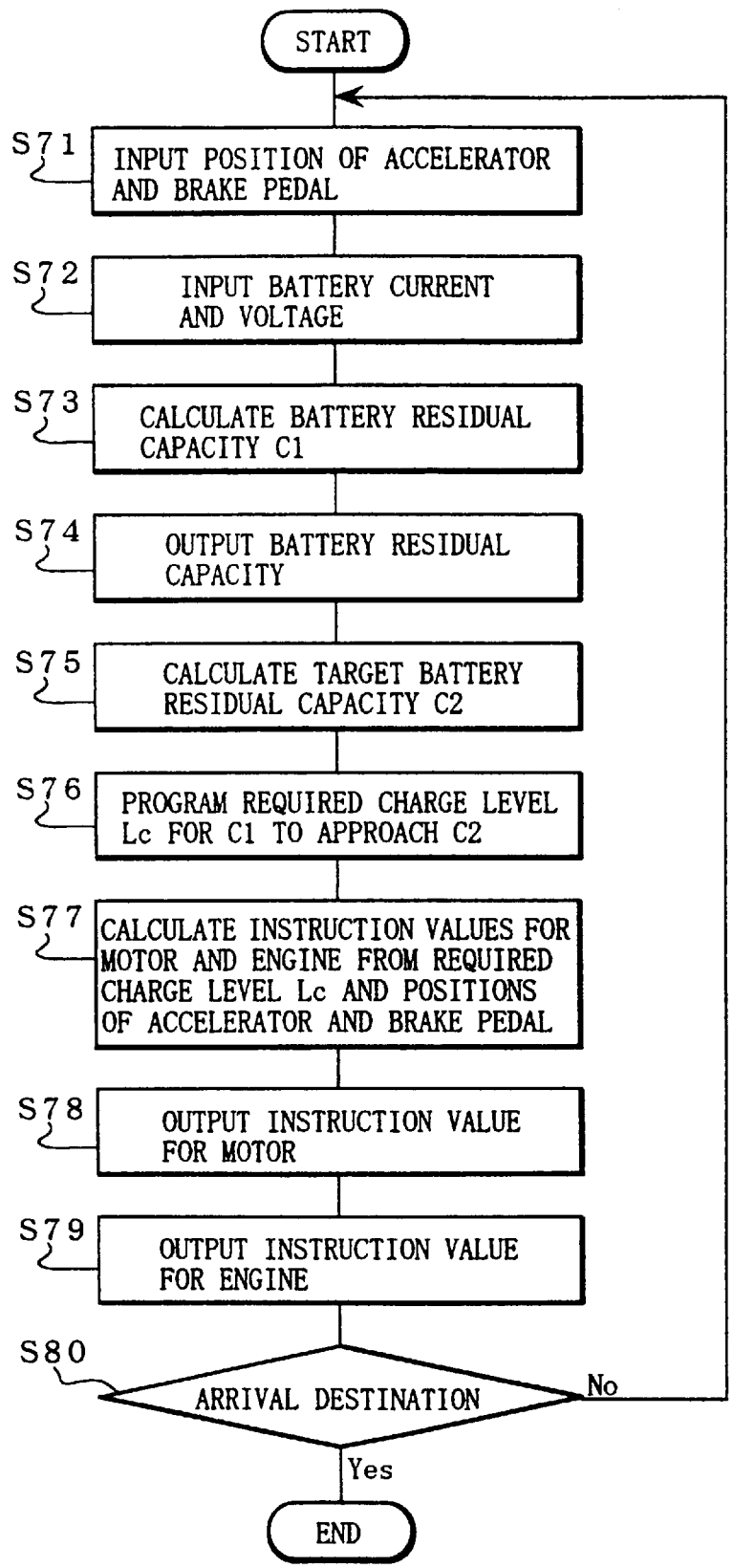
FIG. 7 is a flow chart of a control routine for the gasoline internal combustion engine and the motor executed by the vehicle ECU.

The process by which the vehicle ECU 20 controls the gasoline internal combustion engine 10 and the motor 14, responsive to the target battery residual capacity instruction h from the navigation ECU 30 as described above, will now be described with reference to the block diagram of FIG. 1 and the flow chart of FIG. 7. The vehicle ECU 20 inputs positions of the accelerator and the brake pedal (S71) and the voltage and current of the battery 18 (S72). Residual capacity C1 of the battery 18 is calculated (S73) and a signal therefor output (S74). The vehicle ECU 20 continuously receives input of the target battery residual capacity instruction h from the navigation ECU 30, and a target battery residual capacity C2 is calculated from the signal (S75). The vehicle ECU 20 determines a charge level Lc required for the present battery residual capacity C1 to approach the target battery residual capacity C2 (S76). An instruction value for control of the motor 14 and an instruction value for control of the gasoline internal combustion engine 10 are calculated from the positions of the accelerator and the brake pedal which are input in Step 71, and the required charge level Lc as programmed in Step 76 (S77). Further, the motor instruction value (motor control signal b) is sent to the driver 16 (S78) to supply electric power from the battery 18 to the motor 14. The engine instruction value (throttle signal a) is sent to the throttle 10a (S79) to cause the gasoline internal combustion engine 10 to generate a calculated output. Step 80 determines whether or not the vehicle has arrived at the destination (S80), and if the vehicle has not arrived at the destination ("No" in Step 80), Steps 71 to 79 are repeated to continue drive control of the hybrid vehicle. By repeating the routine, the residual capacity of the battery 18 is decreased in accordance with the battery residual capacity schedule, for example as set forth in FIG. 3(B), to be zero when the vehicle arrives at a destination where battery recharging is provided, thus exhausting the capacity of the battery 18.

Figure 9:
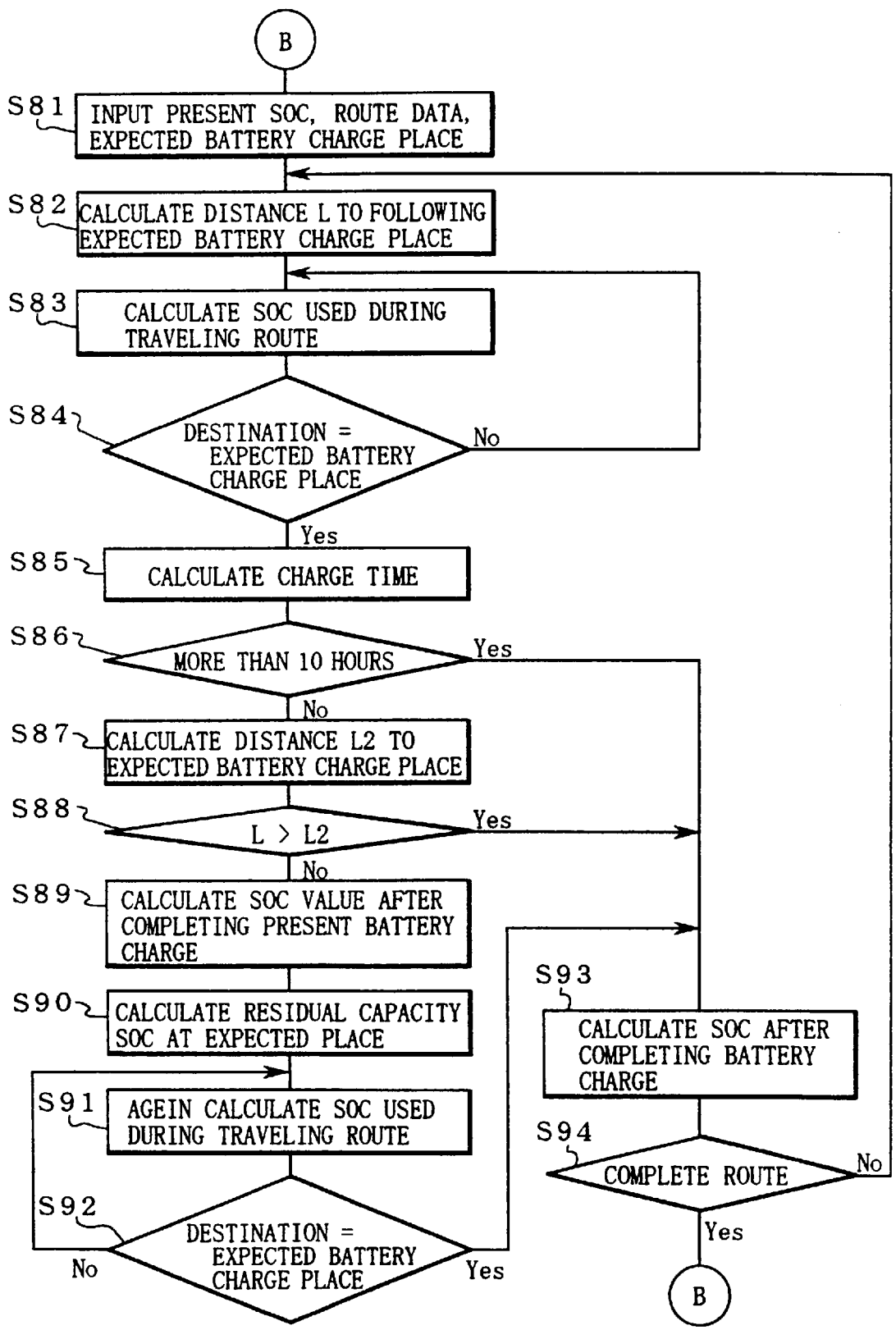
FIG. 9 is a flow chart of a scheduling subroutine used in the target battery residual capacity calculation routine executed by the navigation ECU according to the second embodiment.

A second embodiment according to the present invention has a structure which is the same as the first embodiment described with reference to FIG. 1. In the first embodiment, the navigation ECU 30 programs the battery residual capacity scheduling, by which the value of SOC is to be 0% upon arriving at each battery recharging facility. Therefore, when the actual charge time is less than the ten hours required for a full charge, the next following journey is started at less than 100%, of SOC. However, in the second embodiment, when the charge time is less than the ten hours required for a full charge, the navigation ECU 50 compares the present distance travelled to the distance remaining to be travelled, with the result that, when the remaining distance to be travelled is longer, the battery residual capacity used for the present journey is scheduled to retain a battery residual capacity permitting recharging to full charge within the available charge time, i.e. a time period which is less than the ten hours needed for charging from 0% SOC to 100% SOC. The main routine for the battery residual capacity scheduling programmed by the navigation ECU 50 is the same as in the first embodiment, so that the routine in the second embodiment will be explained with reference to the flow chart of FIG. 4 and to the flow chart of FIG. 9 showing a subroutine of the second embodiment.

In the second embodiment, the navigation ECU 50 includes schedule information memory 51, provisional position memory 52, distance calculating means 53 and battery residual capacity detection means 55, which correspond, respectively, to the schedule information memory 33, the provisional position memory 35, the distance calculating means 37 and the battery residual capacity detector 39 of the first embodiment. However, in this second embodiment the navigation ECU 50 further includes charge time decision means for determining the length of time available for recharging at a destination, based on schedule information input through terminal 40. Navigation ECU 50 further includes battery residual capacity decision means 56 which calculates the battery residual capacity to be reserved for arrival at a destination responsive to a decision by the charge time decision means 54 that (1) the time available for recharging at that destination is less than the time required for charging to 100% SOC and (2) that the travel distance from that destination to the next destination is longer than the travel distance from the starting location to the first destination for recharging. The power consumption programming means 57 of the second embodiment is similar to the power consumption programming means 38 of the first embodiment but here, in the second embodiment, the power consumption programming means 57 takes into account the battery residual capacity value to be reserved for arrival at a first destination, as calculated by the battery residual capacity decision means 55, and plural distances calculated by the distance calculating means. Accordingly, in the second embodiment, the distance calculating means 53 will calculate plural distances including at least a first route travel distance from a starting location to a first destination and a second travel distance from the first destination to a second destination.

The terminal 40 (e.g. an electric diary), as in the case of the first embodiment, is used to input data such as, for each date shown in FIG. 8(A), an expected starting time, an expected arrival time, a starting place, a certain destination and whether or not the battery can be recharged at the destination. When the data schedule m having the aforementioned content as shown in FIG. 8(A) is transmitted from the terminal 40, the navigation ECU 50 proceeds to "Yes" in Step 12 shown in FIG. 4 to input the battery residual capacity (SOC) (S14). This explanation is based on the hypothesis that the value of SOC is input at 100% battery capacity for the fully-charged battery 18. The route search process is started (S16). The route search process determines a route from each starting place to the destination based on the destination schedule data m. In this case, the navigation ECU 50 searches coordinate positions for the starting location, e.g. home, and the destination, e.g. place of business, on the 27th of March, from the data in the self-contained ROM, and then searches for a suitable route linking the coordinate positions by using the map data stored in the ROM. Route 1, from the home to the place of business as shown in FIG. 2, is defined, and then the travel distance for route 1 is calculated. In Step 18, it is determined whether or not the programming of data for the whole route has been completed, with the result that the determination in Step 18 becomes "No" and the routine returns to Step 16 to scan route 2 (see FIG. 2) linking the following starting location (the place of business) to the following destination (the home) on the 27th of March. Then, completing the formation of all data as to the other routes, route 3 between the home and a point A, route 4 between the point A and a point B, route 5 between the point B and the home on the 28th of March, route 6 between the home and the place of business and route 7 between the place of business and the home on the 29th of March, the determination of "Complete route data" in Step 18 results in "Yes", and then the routine proceeds to "Battery residual capacity scheduling process" in Step 20. FIG. 8 (B) is a table indicating the travel distance (Km) for each route shown in FIG. 2.

The battery residual capacity usage scheduling process in Step 20 will be explained with reference to the flow chart of FIG. 9 which shows a subroutine for Step 20. The navigation ECU 50 inputs SOC (the battery residual capacity) at the present position in Step 14, data as to each route searched in Step 16, and further an expected battery recharging location, using the destination schedule data m (S81). The distance L to the next expected battery recharging location is calculated (S82). That is, as shown in FIG. 8(B), the travel distance from the home to the place of business and the travel distance from the place of business to the home on the 27th of March are each 10 Km and, therefore, the distance L, from the starting location (the home) to the next expected battery recharging location (the home), is calculated as 20 Km. Then, the navigation ECU 30 calculates that portion of the battery charge to be used in travelling route 1 from the home to the place of business (S83). Here, a value, in this case the traveling distance (10 Km) for route 1, is divided by the distance L (20 Km) to the next expected battery recharging location and is multiplied by the value of the battery residual capacity (100%) which is input in Step 81. As a result, it is calculated that the SOC used during travel of route 1 is 50% and, therefore, the SOC at the destination will be 50%. Next, it is determined whether or not the destination of route 1 is a battery recharging location (S84), and when the destination (the place of business) is not a battery recharging location ("No" in Step 84), the routine returns to Step 83 to calculate the value of SOC for route 2. By calculating SOC for route 2, the determination as to whether or not the destination in Step 84 has a battery recharging facility results in "Yes" and the routine proceeds to Step 85.

In Step 85, the charge time is calculated as the time between arrival at the battery recharging facility and departure. More specifically, as the schedule in FIG. 8(A) shows, the charge time is calculated as eight hours so that the vehicle arrives at the destination (the home—the expected battery recharging location) at 11:00 p.m. on the 27th of March and departs again at 7:00 a.m. the following day. It is determined whether the charge time is more than the ten hours needed to recharge the battery from SOC 0% to SOC 100% (S86). Naturally, the determination in Step 86 results in "No", and the routine proceeds to Step 87. In Step 87, the distance to the next expected location for battery recharging, namely, a distance L2 on the following day is calculated. Here, the distance L2 is calculated as 50 Km by totaling the traveling distances of route 3, route 4 and route 5.

It is continuously determined whether or not the present distance L calculated in Step 82 is longer than the following distance L2 calculated in Step 87 (S88). In this case, the present distance L is shorter than the following distance L2 ("No" in S88), so that the routine proceeds to Step 89 to calculate the SOC value which can be obtained by presently recharging the battery based on the charge time calculated in Step 85 (S89). The value of 80% is obtained as 100%×8 (the time available for recharging)/10 (the full-charge time). From the value of 80%, the battery residual capacity (SOC) to be gained by the expected recharging, the minimum SOC upon arrival at that destination which can be charged to 100% is calculated (S90). In this case, the remaining 80% is subtracted from 100% to obtain 20%. In other words, since only eight hours are available after travel on the 27th of March, it is necessary to reserve 20% SOC of the battery in order to fully charge the battery by the time of starting travel on the 28th of March. And then, the SOC to be used during travel of the route (route 1) is again calculated (S91). Accordingly, 80% of the SOC can be used for travelling both route 1 and route 2 on the 27th of March. This is calculated by the formula 100%×8 (charge time)/10 (full charge time). Since SOC 80% can be used on the 27th of March, SOC which can be used for the route 1 is 40%, i.e. (route 1 traveling distance 10 Km)/(the total travelling distance 20 Km)×SOC 80%. Thus, the expected SOC at the time of arrival at the destination of the route 1 on the 27th of March is 60%, obtained by subtracting the 40% SOC which can be used for the route 1 from 100% SOC at the departure point (see FIG. 8(B)). It is then determined whether or not the destination of route 1 is the expected battery recharging location (S92) and, in this case, because the destination of route 1 is not the expected battery recharging location ("No" in S92), the routine returns to Step 91 to calculate the value of SOC usage in route 2. By calculating SOC usage in route 2, Step 92 results in "Yes" and the routine proceeds to Step 93 to calculate the value of SOC when the present battery charge is completed. The battery is charged for eight hours, calculated in Step 85 as described above and, therefore, the value of SOC is calculated as 100%, given the SOC value of 20% at initiation of recharging. In Step 94, it is determined whether or not the battery residual capacity scheduling for the whole route has been completed, but here, because the process for the routes on the 27th of March has been completed, Step 94 results in "No" and the routine returns to Step 82.

In Step 82, the distance L to the next expected battery recharging location on the 28th of March is calculated. In this case, the distance L is calculated as 50 Km by adding the travel. distance 20 Km of route 3, the travel distance 10 Km of route 4 and the travel distance 20 Km of route 5. In Step 83, SOC, usage during travel of route 3 is calculated. Here, the value of the travel distance (20 Km) of route 3 is divided by the distance L (50 Km) to the next expected battery recharging location and is then multiplied by the value (100%) for SOC calculated in Step 93 as described above, with the result that the value of 40% is obtained. SOC usage during travel of routes 4 and 5 is calculated, and the destination is the expected recharging facility ("Yes" in S84), and the routine proceeds to Step 85.

In Step 85, the navigation ECU 50 calculates the charge time from when the vehicle arrives at the destination on the 28th of March to when the vehicle departs on the following day (the 29th of March). In this case, the charge time is calculated as 11 hours from 11:00 p.m. to 10:00 a.m. It is then determined whether or not the calculated charge time is more than the required ten hours (S86). Because the calculated charge time is more than ten hours Step 86 results in "Yes" and the routine proceeds to Step 93 to calculate the SOC to be obtained upon completion of battery charging. In this case, the battery can be charged for more than ten hours from zero capacity (0% SOC) and, therefore, the value of 100% is calculated from 100%×10 (the charge time)/10 (the full-charge time). The determination whether or not the battery residual capacity scheduling for the whole route has been completed results in "No" and the routine returns to Step 82.

In the steps following Step 82, the battery residual capacity scheduling on the 29th of March is completed, and the determination in Step 94 then results in "Yes", and the subroutine for battery residual capacity scheduling shown in FIG. 9, (Step 20 in the main routine shown in FIG. 4), has been completed. Therefore, the determination whether or not the scheduling has been completed in Step 22 (FIG. 4) results in "Yes", and thus the process of scheduling the battery usage, which is executed by the navigation ECU 50 before starting the journey, and the schedule for use of the battery residual capacity as shown in FIG. 8(B) have been completed. The navigation ECU 50 sends the target battery residual capacity instruction h to the vehicle ECU 20 to follow the aforementioned schedule during the journey as in the case of the first embodiment and, therefore, the charge of the battery 18 is used according to the battery residual capacity schedule under control of the vehicle ECU 20. In the hybrid vehicle according to the second embodiment, since the battery residual capacity, upon arrival at a destination where the battery is expected to be charged, is determined in accordance with the charge time and the travel distance, it is possible to effectively use the capacity of the battery 18.

In the aforementioned second embodiment, the navigation ECU 50 compares the present travel distance to the next leg of travel or trip distance, when the charge time is less than the ten hours required for a full charge time and when the next travel leg is a longer distance, it schedules battery discharge so that the battery residual capacity does not fall below a level of charge which will allow the battery to be fully recharged in the available charge time which is less than ten hours. Thus, the battery residual capacity scheduled for use in the present trip is defined by proportioning the total battery residual charge in accordance with a comparison of the distance of the present trip with the distance for the next trip, whereby the battery capacity can be most effectively used.

Incidentally, in the first and second embodiments as described, the navigation ECUs 30 and 50 do not account for different road conditions when the battery discharge schedule (in terms of residual battery capacity SOC) is programmed, however, for example, when a significant portion of the travel route is downhill, the scheduling is pre-programmed taking into account charging of the battery by regenerative braking on the downhill slope, whereby the energy consumption can be further decreased.

Furthermore, although the description of the aforementioned embodiments mention only a gasoline internal combustion engine, it is also possible for the present invention to use a diesel engine, a gas-turbine and so on. Furthermore, the internal combustion engine may use, for example, hydrogen, alcohol or propane gas, instead of the gasoline. The use of hydrogen as a fuel is especially advantageous as it does not produce carbon dioxide ($CO_2$).

Furthermore, in the aforementioned embodiments, while a hybrid vehicle is mentioned by way of example, the present invention may also be applied to an electric vehicle.

In either the electric vehicle or the hybrid vehicle, the present invention, as described thus far, allows the use of the capacity of the battery to be optimized, based on the travel schedule, whereby the exhaust of $CO_2$ is minimized by maintaining the use of the internal combustion engine at a minimum. Further, electric power charged into the battery can be used effectively, whereby the amount of the energy used can be decreased.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A vehicle comprising:
   an electric motor for driving drive wheels of the vehicle;
   a battery for supplying electric power to said electric motor;
   a motor drive control unit for controlling the electric motor driving the vehicle by controlling electric power transfer from the battery to the electric motor;
   battery residual capacity detection means for detecting actual residual charge of the battery;
   input means for inputting schedule information including route information pertaining to a travel route for a trip;
   schedule information memory means for storing said schedule information;
   provisional position memory means for storing geographic information, included in said schedule information, relating to geographic positions between a starting location where the battery is charged and a destination having facilities for recharging the battery;
   distance calculating means for calculating total distance from the starting location to the destination, based on the geographic information stored in said provisional position memory means; and
   power consumption programming means for, prior to the start of the trip, scheduling consumption of electric power by said electric motor in accordance with distance travelled, based on the total distance calculated by said distance calculating means and the detected residual capacity of the battery.

2. A vehicle according to claim 1 further comprising an internal combustion engine for driving said drive wheels.

3. A vehicle according to claim 1, wherein said power consumption programming means schedules power consumption in accordance with distance travelled by dividing the battery residual capacity by the calculated total distance.

4. A vehicle according to claim 1 further comprising charge time calculating means for determining time available for recharging the battery during a scheduled stop.

5. A vehicle according to claim 4, wherein said charge time calculating means determines the time available for recharging the battery based on date and time for arrival at a battery charging facility and the date and time for departure from said battery charging facility.

6. A vehicle according to claim 1, wherein the schedule information memory means stores the name and address or phone number for predetermined locations along the travel route.

7. A vehicle according to claim 1, wherein the schedule information includes starting and arrival dates and times for each of plural predetermined locations along the travel route.

8. A vehicle according to claim 1, wherein the schedule information includes information whether or not a battery recharging facility is available at each of plural predetermined locations along the travel route.

9. The vehicle according to claim 1, wherein said input means comprises a touch panel.

10. The vehicle according to claim 1, wherein said battery residual capacity detection means defines, as a discharged state of the battery, a minimum capacity value which allows the battery to be used repeatedly and economically and further defines, as a fully charged state of the battery, a maximum capacity value which allows the battery to be used repeatedly and economically.

11. The vehicle according to claim 1, wherein said input means is an electric diary for transmitting said schedule information by radio wave.

12. The vehicle according to claim 1, wherein said input means is an electric diary for transmitting said schedule information by infrared rays.

13. The vehicle according to claim 1, wherein said input means is a personal computer for transmitting said schedule information by radio wave.

14. The vehicle according to claim 1, wherein said input means is a personal computer for transmitting said schedule information by infrared rays.

15. The vehicle according to claim 1, wherein said input means is an IC card.

16. A vehicle comprising:
    an electric motor for driving drive wheels of the vehicle;
    a battery for supplying electric power to said electric motor;
    a motor drive control unit for controlling the electric motor driving the vehicle by controlling electric power transfer from the battery to the electric motor;
    battery residual capacity detection means for detecting actual residual capacity of the battery;
    input means for inputting schedule information including map data and trip information pertaining to a trip including at least one destination;
    schedule information memory means for storing said schedule information;
    a navigation system for searching said map data to determine a travel route to said one destination;
    provisional position memory means for storing geographic information, included in said schedule information, relating to geographic positions between a starting location where the battery is charged and said one destination where battery recharging is planned;
    distance calculating means for calculating total distance along the travel route determined by said navigation system, based on geographic information stored in said provisional position memory means; and
    power consumption programming means for, prior to start of the trip, scheduling consumption of electric power by said electric motor in accordance with distance travelled, based on the total distance calculated by said distance calculating means and the detected residual capacity of the battery.

17. A vehicle according to claim 16 further comprising an internal combustion engine for driving said drive wheels.

18. A vehicle according to claim 16, wherein said power consumption programming means schedules power consumption in accordance with distance travelled by dividing the battery residual capacity by the calculated total distance.

19. A vehicle according to claim 16 further comprising charge time calculating means for determining time available for recharging the battery during a scheduled stop.

20. A vehicle according to claim 19, wherein said charge time calculating means determines the time available for recharging the battery based on date and time for arrival at a battery charging facility and the date and time for departure from said battery charging facility.

21. A vehicle according to claim 16, wherein the schedule information memory means stores the name and address or phone number for predetermined locations along the travel route.

22. A vehicle according to claim 16, wherein the schedule information includes starting and arrival dates and times for each of plural predetermined locations along the travel route.

23. A vehicle according to claim 16, wherein the schedule information includes information whether or not a battery recharging facility is available at each of plural predetermined locations along the travel route.

24. A vehicle comprising:
an electric motor for driving drive wheels of the vehicle;
a battery for supplying electric power to said electric motor;
a motor drive control unit for controlling the electric motor driving the vehicle by controlling electric power transfer from the battery to the electric motor;
battery residual capacity detection means for detecting actual residual charge of the battery;
input means for inputting schedule information including route information pertaining to a travel route for a trip;
schedule information memory means for storing said schedule information;
provisional position memory means for storing geographic information, included in said schedule information, relating to geographic positions between a starting location where the battery is charged and a first destination having facilities for recharging the battery, and between said first destination and a second destination having facilities for recharging the battery;
charge time decision means for determining, from said schedule information, whether time available for recharging at the first destination is less than the time required for a full recharging wherein battery is recharged from a battery residual capacity of 0% to a battery residual capacity of 100%;
distance calculating means for calculating a first travel distance from a present starting location to the first destination and a second travel distance from the first destination to a second destination based on the geographic information stored in said provisional position memory means;
battery residual capacity decision means for calculating a battery residual capacity value to be reserved for arrival at said first destination, when said charge time decision means has determined that the time available for recharging at said first destination is less than the time required for said full recharging and when said second travel distance is longer than said first travel distance; and
power consumption programming means for scheduling, prior to departure from said starting location, consumption of electric power by said electric motor in accordance with distance travelled, based on the travel distances obtained by said distance calculating means and on a battery residual capacity for said first distance which is obtained by subtracting the calculated reserved battery residual capacity value from the battery residual capacity detected by said battery residual capacity detection means.

25. A vehicle according to claim 24 further comprising an internal combustion engine for driving said drive wheels.

26. A vehicle according to claim 24, wherein said power consumption programming means schedules power consumption for said first distance by dividing said battery residual capacity value by said first travel distance.

27. A vehicle according to claim 24 wherein said battery residual capacity decision means is adapted to compensate the battery residual capacity after the present journey when presently charging.

28. A vehicle according to claim 24 further comprising charge time calculating means for determining time available for recharging the battery during a scheduled stop.

29. A vehicle according to claim 28, wherein said charge time calculating means determines the time available for recharging the battery based on an arrival date and time at the first destination and a departure date and time from the first destination.

30. A vehicle according to claim 24, wherein the schedule information memory means stores the name and address or phone number for predetermined locations along the travel route.

31. A vehicle according to claim 24, wherein the schedule information includes starting and arrival dates and times for each of plural predetermined locations along the travel route.

32. A vehicle according to claim 24, wherein the schedule information includes information whether or not a battery recharging facility is available at each of plural predetermined locations along the travel route.

33. A vehicle comprising:
an electric motor for driving drive wheels of the vehicle;
a battery for supplying electric power to said electric motor;
a motor drive control unit for controlling the electric motor driving the vehicle by controlling electric power transfer from the battery to the electric motor;
battery residual capacity detection means for detecting actual residual charge of the battery;
input means for inputting schedule information including route information pertaining to a travel route for a trip;
schedule information memory means for storing said schedule information;
a navigation system for determining a travel route to a specified destination;
provisional position memory means for storing geographic information, included in said schedule information, relating to geographic positions between a starting location where the battery is charged and a first destination having facilities for battery recharging, and between the first destination and a second destination having facilities for battery recharging;
charge time decision means for determining whether or not the time available for recharging at said first destination is less than the time required to recharge the battery from a battery residual capacity of 0% to 100%;
distance calculating means for calculating distances along the determined travel route including a first distance from the starting location to the first destination and a second distance from the first destination to the second destination based on the geographic information stored in said provisional position memory means;
battery residual capacity decision means for calculating a battery residual capacity to be reserved for arrival at said first destination, when said charge time decision means has determined that the time available for recharging at said first destination is less than the time required for said full recharging and when said second travel distance is longer than said first travel distance; and
power consumption programming means for, prior to departure from said starting location, scheduling consumption of electric power by said electric motor in accordance with distance travelled, based on the travel distances obtained by said distance calculating means and on a battery residual capacity value for said first travel distance which is obtained by subtracting the calculated reserved battery residual capacity from the battery residual capacity detected by said battery residual capacity detection means.

34. A vehicle according to claim 33 further comprising an internal combustion engine for driving said drive wheels.

35. A vehicle according to claim 33, wherein said power consumption programming means schedules power consumption for said first distance by dividing said battery residual capacity value for said first travel distance, by said first travel distance.

36. A vehicle according to claim 33 wherein said battery residual capacity decision means is adapted to compensate the battery residual capacity after the present journey when presently charging.

37. A vehicle according to claim 33 further comprising charge time calculating means for determining time available for recharging the battery during a scheduled stop.

38. A vehicle according to claim 33, wherein the schedule information memory means stores the name and address or phone number for predetermined locations along the travel route.

39. A vehicle according to claim 33, wherein the schedule information includes starting and arrival dates and times for each of plural predetermined locations along the travel route.

40. A vehicle according to claim 33, wherein the schedule information includes information whether or not a battery recharging facility is available at each of plural predetermined locations along the travel route.

41. A vehicle according to claim 33, wherein said charge time calculating means determines the time available for recharging the battery based on an arrival date and time at the first destination and a departure date and time from the first destination.

* * * * *